(No Model.)

P. RAAB.
ROAD SCRAPER.

No. 400,483. Patented Apr. 2, 1889.

WITNESSES.
Gustav Bohn.
E. B. Griffith.

INVENTOR.
Peter Raab.
By C. F. Jacobs
atty.

UNITED STATES PATENT OFFICE.

PETER RAAB, OF NEAR INDIANAPOLIS, INDIANA.

ROAD-SCRAPER.

SPECIFICATION forming part of Letters Patent No. 400,483, dated April 2, 1889.

Application filed November 12, 1888. Serial No. 290,546. (No model.)

*To all whom it may concern:*

Be it known that I, PETER RAAB, of Indianapolis, county of Marion, and State of Indiana, have invented certain new and useful Improvements in Road Scrapers and Graders; and I do hereby declare that the following is a full, clear, and exact description thereof, reference being had to the accompanying drawings, in which like letters refer to like parts.

My invention relates to the construction of machines for scraping and grading roadways; and it consists in the construction and arrangement of the several parts so that the angle of the scraper to the line of draft may be varied at the pleasure of the operator, the whole being an improvement upon the device shown in Letters Patent No. 288,261, issued to me on the 13th day of November, 1883, and which will be understood from the following description.

Figure 1:
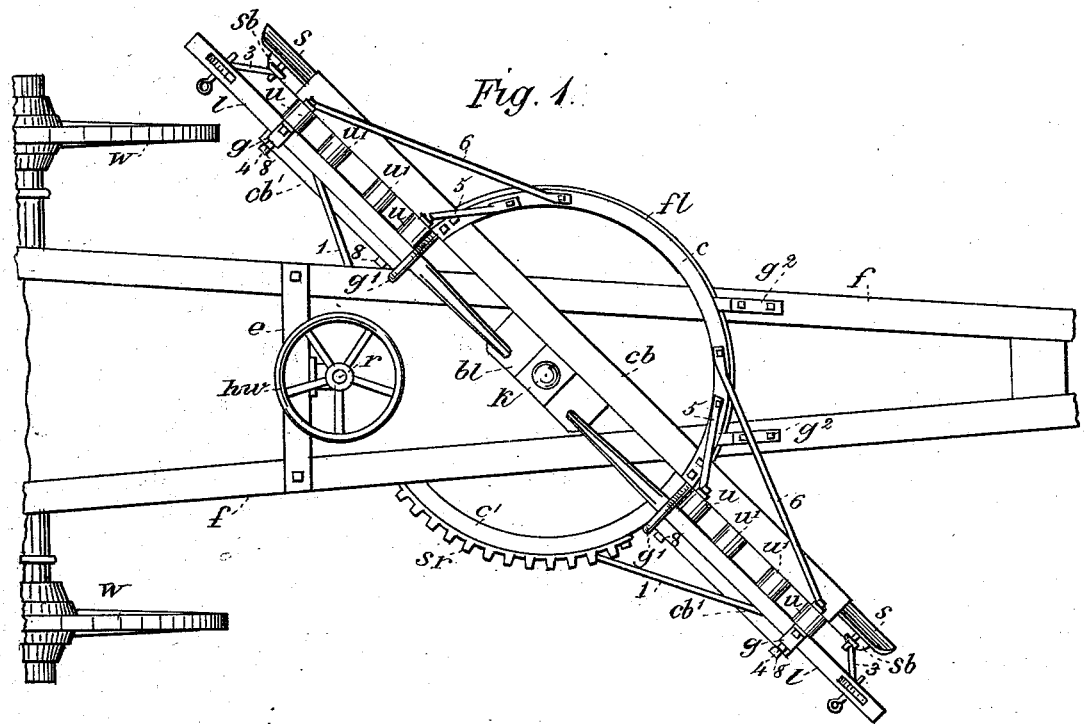
Figure 2:
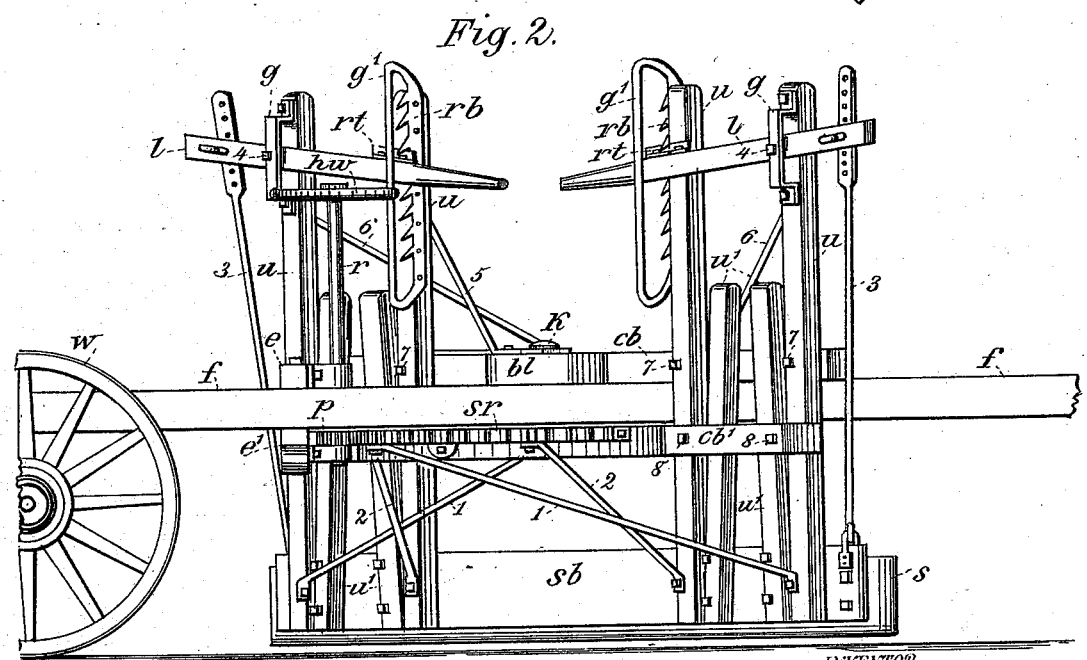

In the drawings, Figure 1 represents a top view of my mechanism, the front axle and wheel of the truck being removed. Fig. 2 is a side view of the same.

The whole mechanism is carried upon a frame-work, $f$, which is made preferably in the shape shown in Fig. 1 and mounted upon a four-wheeled truck of the usual form. The scraping mechanism consists of the scraper $s$, bolted to one side of the scraper-bar $sb$, this bar being sustained by the rods 3, whose lower ends hook into staples fastened at the outer ends of the scraper-bar, the upper ends of these rods being fastened by a pin to the outer ends of the lifting-levers $l$. Holes are made at the upper ends of the rods 3 to permit their adjustment for shorter or greater length by means of the pin, as shown in Fig. 2. To the scraper-bar are bolted pairs of uprights $u'$, whose upper ends are preferably inclined toward each other, as shown. These move between the rigid uprights $u$, which are bolted at 7 to the top cross-bar, $cb$, and at 8 to the lower cross-bar, $cb'$, and are rigidly braced below by braces 1 and 2, which are bolted to the under side of the circle $c'$. The uprights $u$ are furnished at the top with guides $g$ $g'$, and the levers $l$ are pivoted at 4 to these uprights $u$, the handle end of these levers extending through the guides $g'$, within reach of the operator, and a ratchet-plate is secured to the upper edge of these levers, which is adapted to engage with teeth upon the ratchet-bar $rb$, bolted to the side of the upright. It follows that by pressing upon the handle of either of the levers $l$, the pivot 4 being the fulcrum, the corresponding end of the scraper may be lifted, and a contrary movement will lower it, so that the height of the cutting-edge of the scraper above the roadway may be regulated as desired. As the scraper rises, the uprights $u'$ rise with it, and these are kept in position between the uprights $u$, inasmuch as their outer faces press against the inner side of the lower cross-bar, $cb'$, and their opposite faces against the inside of the upper cross-bar, $cb$, thus preventing any lateral motion, and the scraper is thus held firmly in position during its ascent and descent, and by means of the ratchet it may be locked at any point. This part of the mechanism—namely, the scrapers, the levers, the uprights, and the ratchet-bar and plate for securing the levers in position—is substantially the same as that shown in my former Letters Patent; but the improvement for which this application is made consists in providing means for allowing the scraper-bar and its other connected parts to be turned about in an arc of a circle, so as to increase or diminish its angle to the line of draft. For this purpose I secure a circular segment, $c$, to the upper cross-bar, $cb$, bolting it at the ends and bracing it by braces 5 and 6, as shown in Fig. 1. The upper part of this circle may be conveniently made of wood; but its base is made of iron and wider than the circle proper, and this iron base, extending beyond the circle $c$, forms a flange, $fl$, which moves beneath the shouldered ends of the guides $g^2$, bolted to the upper side of the frame-work, as shown in Fig. 1, and these guides $g^2$ press against the flange $fl$, holding it in place during its rotation. A corresponding circular piece, $c'$, having a segment-rack, $sr$, upon its outer edge, is bolted to the under side of the lower bar, $cb'$, in a similar manner.

$bl$ is a block, which may be formed integral therewith or secured in any suitable manner to the side of the cross-bar $cb$, as shown in Fig. 1, and having an opening to receive a pivotal king-bolt, $k$, which passes through the block and through the lower cross-bar, to which the under circular piece is secured, and about the king-bolt as a pivot the elevating and scraping mechanism may be rotated bodily in the manner hereinafter described. This is true because the upper circle, c, is connected by braces 5 5 6 6 to the uprights uu uu and bolted at each end to the cross-bar cb. The lower circle, c', is connected by braces 1 1 2 2 to the same uprights and bolted on each end to the lower cross-bar, cb', in the same way as the upper circle is bolted to the upper cross-bar, and the scraper, with its lever mechanism, is sustained by these same uprights, uu uu, and as the latter rotate with the circles they of course carry with them the scraper and its lever mechanism. This rotary movement is accomplished by means of the hand-wheel hw, which is mounted on the top of the rod r, this hand-wheel carried in upper and lower bearings, e e', connected to the frame-work, the lower end of this rod carrying a small pinion, p, whose teeth engage with those of the segment-rack, and when the operator turns the hand-wheel hw and the rod to which it is secured the pinion mounted on the lower end of this rod will operate to produce a corresponding movement of the segment-rack and the parts connected therewith, for as the segment-rack is forced in either direction by means of the engagement of the pinion with its teeth it carries with it the circular part c', and as this is rigidly connected to the grading and scraping mechanism, as above described, the latter must be given a corresponding movement, and thus the angle of the scraper as related to the line of draft may be changed within the limits of movement allowed by the length of the rack-bar at the pleasure of the operator. My present machine therefore comprises the combination of an adjustable scraper with its lifting mechanism, and means, such as shown, for giving this latter a rotary movement, so as to change the angle of the line of the scraper to the line of draft.

It will thus be seen that the entire operative mechanism, including the scraper, the levers for making its vertical adjustment, and the rotating mechanism for changing its angle to the line of draft, is carried upon the frame-work f, which unites the fore and aft trucks, this frame-work passing loosely between the upper and lower cross-bars, cb cb', the weight of the machine bearing upon the surface of the upper cross-bar.

What I claim as my invention, and desire to secure by Letters Patent, is the following:

1. A road grader and scraper comprising a frame-work mounted on trucks, the scraper sustained by such frame-work between the fore and aft wheels at any suitable angle to the line of draft, lever mechanism for raising and lowering the scraper, a ratchet device connected to the posts of the frame for locking the levers at different heights, a circular frame-work composed of two sections, the upper half resting upon the main frame-work of the machine having a metal flange at the bottom which is adapted to rotate beneath guides bolted to the frame-work, which hold it in place, the lower half sustained beneath such main frame-work provided with a segment-gear for engaging with a pinion mounted on a hand-wheel, the latter moving in bearings connected to a cross-bar of the frame, whereby the entire scraper mechanism may be rotated to change the angle of the scraper to the line of draft, all combined substantially as described.

2. In a road-grading machine, a frame-work mounted on trucks, a scraper carried thereon and adjustable in a vertical plane by means of lever mechanism for regulating the depth of the cut of the scraper-blade, such scraper mechanism connected to a secondary frame-work which is supported upon the frame-work that unites the truck and rotatable upon such frame-work by means of a circular frame, one half of which is supported upon the frame-work that unites the trucks, and the other beneath the same and provided with a segmental gear which engages with a pinion mounted upon a hand-wheel for rotating the scraper mechanism, all combined substantially as shown and described.

3. In a road-grading machine, the main frame f, uniting the fore and aft trucks of the wagon, the scraper-bar sb, having a scraper attached, and movable in a vertical plane by means of the levers l l, and their connection to the scraper-bar, ratchet mechanism for locking the same in position, the circular segment c, fastened to the cross-bar cb, the whole resting upon the frame f, such segment having a flange, fl, moving beneath guides g, bolted to the frame-work f, the lower segment, c, having a segment-rack, sr, a hand-wheel, hw, moving in bearings connected to the cross-bar of the main frame, the pinion p, mounted on the lower end of the rod of the hand-wheel and engaging with the segment rack sr, the block bl, bolted to the cross-bar cb, and a king-bolt, kb, uniting the parts, all combined substantially as shown and described.

In witness whereof I have hereunto set my hand this 24th day of October, 1888.

PETER RAAB.

Witnesses:
C. P. JACOBS,
E. B. GRIFFITH.